United States Patent
Nakagawa et al.

(10) Patent No.: US 9,740,186 B2
(45) Date of Patent: Aug. 22, 2017

(54) MONITORING CONTROL SYSTEM AND CONTROL DEVICE

(71) Applicant: Mitsubishi Electric Corporation, Tokyo (JP)

(72) Inventors: Koichi Nakagawa, Tokyo (JP); Kunio Matsumoto, Tokyo (JP); Noriyasu Fukatsu, Tokyo (JP); Hiroshi Ashiya, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 43 days.

(21) Appl. No.: 14/778,655

(22) PCT Filed: Jan. 31, 2014

(86) PCT No.: PCT/JP2014/052343
§ 371 (c)(1),
(2) Date: Sep. 21, 2015

(87) PCT Pub. No.: WO2015/114821
PCT Pub. Date: Aug. 6, 2015

(65) Prior Publication Data
US 2016/0054718 A1   Feb. 25, 2016

(51) Int. Cl.
G05B 19/00 (2006.01)
G05B 19/042 (2006.01)
G05B 19/418 (2006.01)

(52) U.S. Cl.
CPC ..... G05B 19/0428 (2013.01); G05B 19/4183 (2013.01); G05B 2219/32404 (2013.01); Y02P 90/10 (2015.11)

(58) Field of Classification Search
CPC ............ G05B 19/0428; G05B 19/4183; G05B 2219/32404; Y02P 90/02; Y02P 90/10
(Continued)

(56) References Cited

U.S. PATENT DOCUMENTS 5,164,894 A * 11/1992 Cunningham-Reid ... G05B 15/02
                                                              221/9
6,004,019 A * 12/1999 Suita ................... B23K 11/252
                                                              700/2
(Continued)

FOREIGN PATENT DOCUMENTS

DE         199 47 252 A1   5/2001
DE    10 2009 041 781 A1   3/2011
(Continued)

OTHER PUBLICATIONS

English translation of DE102009041781A1, Obenaus et al, published Mar. 17, 2011.*

(Continued)

*Primary Examiner* — Edwin Holloway, III
(74) *Attorney, Agent, or Firm* — Sughrue Mion, PLLC; Richard C. Turner

(57) ABSTRACT

A monitoring control system includes a control device that performs a device control process, and a high-order system that monitors the device control process. The control device includes a control CPU that performs the device control process, and an information CPU that is connected to the control CPU via an internal bus. The control CPU includes a device memory that stores therein device data to be used for the device control process, the device data being related to the device. The information CPU includes a built-in database and a data collection unit. The data collection unit performs a data collection process of reading the device data from the device memory via the internal bus, and storing the read device data in the built-in database.

7 Claims, 11 Drawing Sheets

(58) Field of Classification Search
USPC ........................................ 340/3.3, 3.31, 3.32
See application file for complete search history.

(56) References Cited

U.S. PATENT DOCUMENTS

| | | |
|---|---|---|
| 6,973,508 B2 | 12/2005 | Shepard et al. |
| 7,181,550 B2 | 2/2007 | Shepard et al. |
| 2009/0276059 A1 | 11/2009 | Tone et al. |
| 2010/0198781 A1 | 8/2010 | Yuine et al. |
| 2014/0052701 A1* | 2/2014 | Olmino ............. G06F 17/30516 |
| | | 707/693 |

FOREIGN PATENT DOCUMENTS

| | | |
|---|---|---|
| JP | 2004-038930 A | 2/2004 |
| JP | 2008-282323 A | 11/2008 |
| JP | 2009-086863 A | 4/2009 |
| WO | 2007/110953 A1 | 10/2007 |
| WO | 2008/146477 A1 | 12/2008 |

OTHER PUBLICATIONS

Communication dated Apr. 29, 2016, from the German Patent Office in counterpart Application No. 11 2014 001 892.9.
International Search Report of PCT/JP2014/052343 dated Apr. 28, 2014.

* cited by examiner

FIG.3

D1: SIGNAL DEFINITION DATA

| SIGNAL NUMBER | | 001 | 002 | 003 |
|---|---|---|---|---|
| ATTRIBUTE | TYPE OF VARIABLES | ANALOG | DIGITAL | ANALOG |
| | NAME | "ROTATION NUMBER" | "DRIVE" | "WATER LEVEL" |
| | DATA TYPE | float | byte | Integer |
| | NETWORK NUMBER | 1 | 1 | 1 |
| | STATION NUMBER | 10 | 10 | 20 |
| | DEVICE TYPE | "D" | "D" | "D" |
| | ADDRESS | 1000 | 1100 | 1000 |

FIG.4

D2: OPERATION DEFINITION DATA

| OPERATION NUMBER | | 001 | 002 |
|---|---|---|---|
| ATTRIBUTE | | | |
| | ACTIVATION CONDITION EXPRESSION | (S2000)>100 | T(100)==1 |
| | OUTPUT SIGNAL | S1000 | S1001 |
| | ARITHMETIC EQUATION | =({S1010}+{S1020})/2 | ={S1030}*10 |

MONITORING CONTROL SYSTEM AND CONTROL DEVICE

CROSS REFERENCE TO RELATED APPLICATIONS

This is a National Stage of International Application No. PCT/JP2014/052343 filed Jan. 31, 2014, the contents of which are incorporated herein by reference in its entirety.

FIELD

The present invention relates to a control device that performs a device control process, and to a monitoring control system that monitors a device control process.

BACKGROUND

A PLC (Programmable Logic Controller) is a control device that is used to control an automated machine in a factory or the like. Such a control device is connected to various devices (apparatuses) such as a sensor and an actuator, so as to control operations of these devices by executing a control program. The process of controlling operations of these devices is hereinafter referred to as "device control process".

In recent years, a technique of performing integrated information management in cooperation with control devices such as the PLC and an external information system has been put to practical use. As this kind of technique, MES (Manufacturing Execution System) and ERP (Enterprise Resource Planning) can be mentioned.

In a large scale plant such as a water treatment plant or a chemical plant, high-speed and large-capacity data is handled. In such a large scale plant, a monitoring control system referred to as "SCADA (Supervisory Control And Data Acquisition)" is generally used. As functions of the SCADA, a data collection function and a user interface function can be mentioned. The data collection function is a function of collecting device data from devices such as a sensor in a plant and storing the collected device data in a database. The user interface function is a function of displaying device data on a display screen of a monitoring terminal and receiving data manipulation from the user. The user can monitor the device control device in the plant and perform required data manipulation, based on the data displayed on the display screen of the monitoring terminal.

As a control device that transfers data between an external information system and the device itself, the following devices have been known.

Patent Literature 1 discloses a distributed control device. This distributed control device includes a main processor for device control and a communication processor for data communication. Owing to this configuration, even if the distributed control device receives large-amount data acquisition requests from a high-order system, influences thereby on the device control process can be reduced.

Patent Literature 2 discloses a technique for remotely controlling a PLC through the Internet. The PLC receives a data transmission request related to a user program from a remote control computer. In response to the transmission request, the PLC transmits the user program and control information in a database to the remote control computer.

CITATION LIST

Patent Literatures

Patent Literature 1: Japanese Patent Application Laid-open No. 2008-282323

Patent Literature 2: Japanese Patent Application Laid-open No. 2009-86863

SUMMARY

Technical Problem

In the case of conventional SCADAs, a monitoring terminal executes SCADA software. In this case, high reliability and high quality in software execution are required in a plant, and therefore, an expensive dedicated PC such as an industrial PC (an FA personal computer) is required as the monitoring terminal that executes the SCADA software. This leads to a cost increase.

An object of the present invention is to provide a technique that can realize a monitoring control system that monitors a device control process at a low cost.

Solution to Problem

According to an aspect of the present invention, there is provided a monitoring control system including: a control device that performs a device control process of controlling an operation of a device; and a high-order system that is connected to the control device and including a monitoring terminal for monitoring the device control process, wherein the control device includes a control CPU that performs the device control process, and an information CPU that is connected to the control CPU via an internal bus, the control CPU includes a device memory that stores therein device data to be used for the device control process, the device data being related to the device, the information CPU includes a built-in database, a data collection unit that performs a data collection process of reading the device data from the device memory via the internal bus, and storing the read device data in the built-in database, and an external transfer processing unit that transfers the device data stored in the built-in database to an external database provided in the high-order system if an external transfer condition is satisfied, and wherein the monitoring terminal acquires the device data from the external database or the built-in database by a search process.

According to another aspect of the present invention, there is provided a control device that performs a device control process of controlling an operation of a device and is connected to a high-order system that includes a monitoring terminal for monitoring the device control process, the control device including: a control CPU that performs the device control process; and an information CPU that is connected to the control CPU via an internal bus, wherein the control CPU includes a device memory that stores therein device data to be used for the device control process, the device data being related to the device, and the information CPU includes a built-in database, and a data collection unit that performs a data collection process of reading the device data from the device memory via the internal bus, and storing the read device data in the built-in database, and an external transfer processing unit that transfers the device data stored in the built-in database to an external database provided in the high-order system if an external transfer condition is satisfied, and wherein the monitoring terminal acquires the device data from the external database or the built-in database by a search process.

Advantageous Effects of Invention

According to the present invention, it is possible to realize a monitoring control system that monitors a device control process at a low cost.

BRIEF DESCRIPTION OF DRAWINGS

FIG. 3 is a conceptual diagram illustrating an example of signal definition data according to the first embodiment of the present invention.

FIG. 4 is a conceptual diagram illustrating an example of operation definition data according to the first embodiment of the present invention.

DESCRIPTION OF EMBODIMENTS

Exemplary embodiments of the present invention will be explained below with reference to the accompanying drawings.

First Embodiment

<Monitoring Control System>

Figure 1:
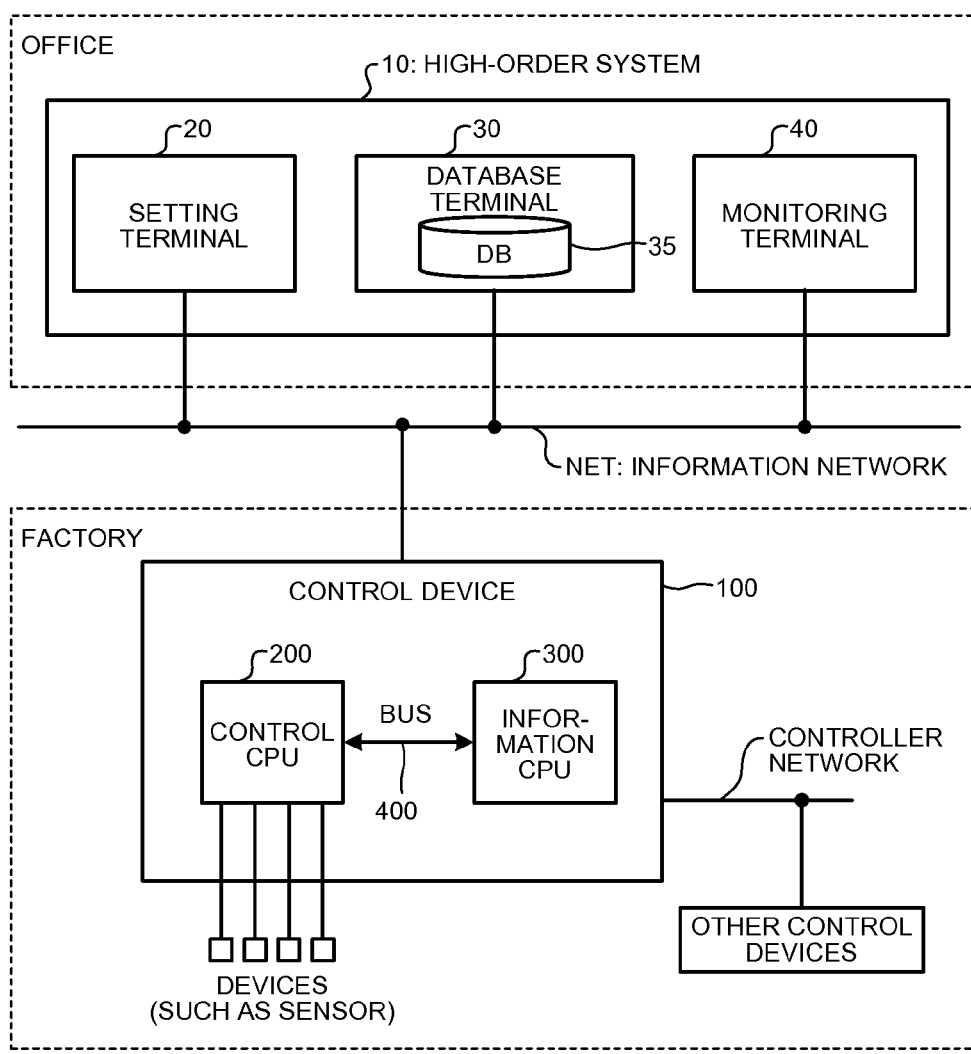
FIG. 1 is a block diagram schematically illustrating a configuration example of a monitoring control system according to a first embodiment of the present invention.

FIG. 1 is a block diagram schematically illustrating a configuration example of a monitoring control system 1 according to a first embodiment of the present invention. The monitoring control system 1 includes a high-order system 10 and a control device 100. The high-order system 10 and the control device 100 are communicably connected with each other via an information network NET.

The control device 100 performs a device control process. Specifically, the control device 100, which is connected to various devices (apparatuses) such as a sensor and an actuator in a factory, executes a control program so as to control operations of these devices. As the control device 100, a PLC can be exemplified. Further, in the factory, a plurality of control devices 100 are communicably connected with each other via a controller network.

The high-order system 10 is a system that monitors the device control process performed by the control device 100, and is connected to the control device 100 via the information network NET. For example, the high-order system 10 is provided in an office outside a factory area. The high-order system 10 includes a setting terminal 20, a database terminal 30, and a monitoring terminal 40.

The setting terminal 20 is a terminal that performs various types of setting for the control device 100. Details of a setting process using the setting terminal 20 are described later. Note that the connection means between the setting terminal 20 and the control device 100 is not limited to the information network NET. The setting terminal 20 and the control device 100 can be directly connected via a cable, or connected wirelessly by WiFi or the like.

The database terminal 30 includes an external database 35. Database processing such as high-speed search is possible for the external database 35 by using a database language such as SQL. As described later, the external database 35 is used for saving device data collected by the control device 100. Note that the device data is data related to devices controlled by the control device 100, and used for the device control process.

The monitoring terminal 40 is a terminal that monitors the device control process performed by the control device 100. The monitoring terminal 40 can display device data collected by the control device 100 on a display unit and can receive data manipulation from a user. Based on the data displayed on the display unit, the user can monitor the device control process in a plant and can perform required data manipulation. Details of the monitoring terminal 40 are described later.

<Configuration Example of Control Device>

Details of the control device 100 are described below. As illustrated in FIG. 1, the control device 100 according to the present embodiment is equipped with a control CPU 200 and an information CPU 300 separately. The control CPU 200 and the information CPU 300 are connected with each other via a bus 400 (internal bus).

The control CPU 200 is a CPU for the device control process. That is, by executing the control program, the control CPU 200 controls operations of devices such as a sensor and an actuator.

Meanwhile, the information CPU 300 is a CPU for a data collection process. Here, the data collection process is a process of collecting device data and saving collected device data in a database. That is, according to the present embodiment, the information CPU 300 of the control device 100 functions as a part of conventional SCADA functions.

Figure 2:
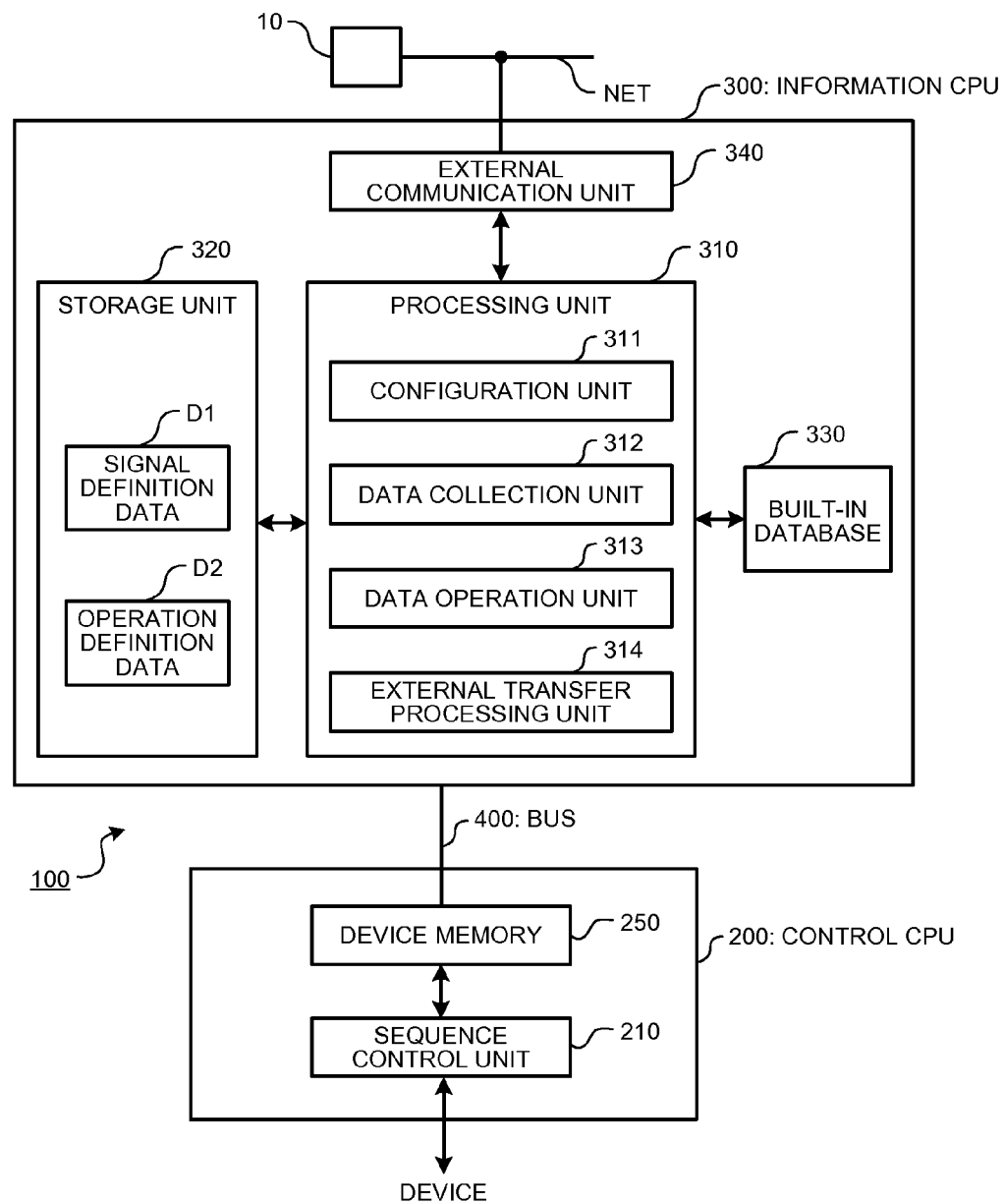
FIG. 2 is a block diagram illustrating a configuration example of a control device according to the first embodiment of the present invention.

FIG. 2 is a block diagram illustrating a configuration example of the control device 100 according to the present embodiment. The control device 100 is described here in more detail with reference to FIG. 2.

The control CPU 200 that performs the device control process includes a sequence control unit 210 and a device memory 250.

The sequence control unit 210 executes sequence control of devices such as a sensor. The sequence control unit 210 is realized by the control CPU 200 for executing a sequence control program described in a ladder language or the like. The sequence control program may be recorded on a computer readable recording medium.

The device memory 250 is an internal memory. Device data to be used for the device control process is stored in the device memory 250.

The information CPU 300 is connected to the device memory 250 in the control CPU 200 via the bus 400 (internal bus). The information CPU 300 includes a processing unit 310, a storage unit 320, a built-in database 330, and an external communication unit 340.

The processing unit 310 is a data processing device that performs various types of data processing. As illustrated in FIG. 2, the processing unit 310 includes, as functional blocks, a configuration unit 311, a data collection unit 312, a data operation unit 313, and an external transfer processing unit 314. These functional blocks are realized by the processing unit 310 for executing a data processing program. Note that the data processing program may be recorded on a computer readable recording medium. Details of processes performed by the processing unit 310 are described later.

The storage unit 320 is a memory that stores therein definition data and the like. For example, signal definition data D1 and operation definition data D2 are stored in the storage unit 320.

The signal definition data D1 is data that defines an attribute of a signal (including device data) handled in a plant. FIG. 3 illustrates an example of the signal definition data D1. Signal numbers are numbers for identifying each signal. The attribute of each signal includes "type of variables", "name", "data type", "network number", "station number", "device type", and "address".

The "type of variables" indicates a category of the signal, and elements such as analog, digital, pulse, and counter are exemplified as this category. The "name" is a signal name described in a mode easily understandable by a human. As the "data type", elements such as integer (16-bit integer), float (a 32-bit floating decimal point), long (32-bit integer), and double (a 64-bit floating decimal point) can be mentioned.

The "network number" is an identification number of a network to which the control device 100 handling the signal is connected. The "station number" is an identification number of the control device 100 that is handling the signal in the network indicated by the network number. That is, the control device 100 handling the signal is uniquely specified by the network number and the station number.

The "device type" indicates a type of a memory that is included in the device memory 250 of the control device 100, and the memory in which the signal is stored. As the device type, a data memory, a latch memory, and an internal register can be mentioned. The "address" indicates a storage location of the signal in the memory indicated by the device type. That is, the storage location of the signal is uniquely specified by the device type and the address.

The operation definition data D2 defines arithmetic processing (described later) to be performed by the information CPU 300. FIG. 4 illustrates an example of the operation definition data D2. An operation number is a number for identifying each of arithmetic processing. The attribute of the arithmetic processing includes "activation condition expression", "output signal", and "arithmetic equation".

The "activation condition expression" indicates a condition for starting the arithmetic processing. That is, if the condition indicated by the activation condition expression is satisfied, then the arithmetic processing is performed. The "output signal" indicates a signal number of a signal being designated as a storage location, as a result of the arithmetic processing. The "arithmetic equation" indicates the contents of the arithmetic processing.

In the example illustrated in FIG. 4, the arithmetic processing of an operation number 001 is performed when a value of the signal S2000 becomes larger than 100, and a mean value of the value of the signal S1010 and the value of the signal S1020 is output as a signal S1000. The arithmetic processing of an operation number 002 is performed when a timer set to 100 milliseconds is timed up, and a value obtained by multiplying a value of a signal S1030 by 10 is output as a signal S1001.

As another example of the arithmetic processing, it is also conceivable to convert the unit of the device data to a unit that the high-order system 10 can easily handle. For example, it is assumed that an output of a sensor that detects the water level of a pump well is expressed as a signal current X [mA] normalized in a range of 4 mA to 20 mA. There is considered a case where the signal current X [mA] is converted to a water level [m] in a range of 0 to 5 meters. In this case, arithmetic processing expressed by the following equation (1) is required.

Equation (1)

$$\text{water level [m]} = (5\,[m] - 0\,[m]) \times (X[mA] - 4\,[mA]) / (20\,[mA] - 4\,[mA]) \quad (1)$$

The signal definition data D1 and the operation definition data D2 are set by the setting terminal 20 of the high-order system 10. Specifically, a user uses the setting terminal 20 to perform inputting and editing of the signal definition data D1 and the operation definition data D2. The setting terminal 20 transfers the signal definition data D1 and the operation definition data D2 to the control device 100. The information CPU 300 of the control device 100 receives the signal definition data D1 and the operation definition data D2 from the setting terminal 20. The configuration unit 311 of the processing unit 310 of the information CPU 300 stores the received signal definition data D1 and operation definition data D2 in the storage unit 320.

Note that the control device 100 may transfer the signal definition data D1 and the operation definition data D2 to another control device 100 via the controller network. That is, data may be shared among the plurality of control devices 100 that are connected to the same network. Any of these control devices 100 can access all the pieces of data.

Referring back to FIG. 2, the built-in database 330 is a database that saves device data. For the built-in database 330, database processing such as high-speed search can be performed by using a database language such as SQL.

The external communication unit 340 is a network interface for the information network NET. The processing unit 310 can access the information network NET via the external communication unit 340.

<Functions of Information CPU>

Functions of the processing unit 310 of the information CPU 300 are described below.

The configuration unit 311 receives the signal definition data D1 and the operation definition data D2 from the setting terminal 20. The configuration unit 311 stores the received signal definition data D1 and operation definition data D2 in the storage unit 320.

The data collection unit 312 performs a data collection process. Specifically, the data collection unit 312 refers to the signal definition data D1 stored in the storage unit 320 to collect device data defined in the signal definition data D1 from the device memory 250. In this case, because the information CPU 300 and the device memory 250 are connected with each other via the high-speed bus 400, the data collection unit 312 can read the device data from the device memory 250 via the bus 400 at a high speed. The data collection unit 312 stores the read device data in the built-in database 330. For example, the data collection unit 312 regularly performs the data collection process. The data The data operation unit 313 performs data operation processing. Specifically, the data operation unit 313 refers to the operation definition data D2 stored in the storage unit 320 to perform the arithmetic processing defined in the operation definition data D2. That is, if the activation condition of the arithmetic processing is satisfied, then the data operation unit 313 performs the specified arithmetic processing on the device data read from the device memory 250 in the data collection process. Thereafter, the data operation unit 313 writes a result of the arithmetic processing ("output signal" in FIG. 4) in the device memory 250.

If an external transfer condition is satisfied, then the external transfer processing unit 314 performs an external transfer process. The external transfer process is a process of transferring at least a part of the device data stored in the built-in database 330 to the external database 35 of the high-order system 10. That is, in the present embodiment, the built-in database 330 is used as a "cache", and the contents of the built-in database 330 are reflected in the external database 35 as required.

As an example of the external transfer condition, it is conceivable that "the data collection unit 312 is not performing a data collection process", that is, it is "idle time". As another example of the external transfer condition, it is conceivable that "a usage rate of the built-in database 330 has exceeded a predetermined threshold (usage rate threshold)". As still another example of the external transfer condition, it is conceivable that "a load (communication traffic or the like) of the control device 100 is lower than a predetermined threshold (load threshold)". The external transfer condition may be any one of these conditions or may be arbitrary combinations of these conditions.

An example of a processing flow by the processing unit 310 is described next with reference to FIG. 5 to FIG. 7.

Figure 5:
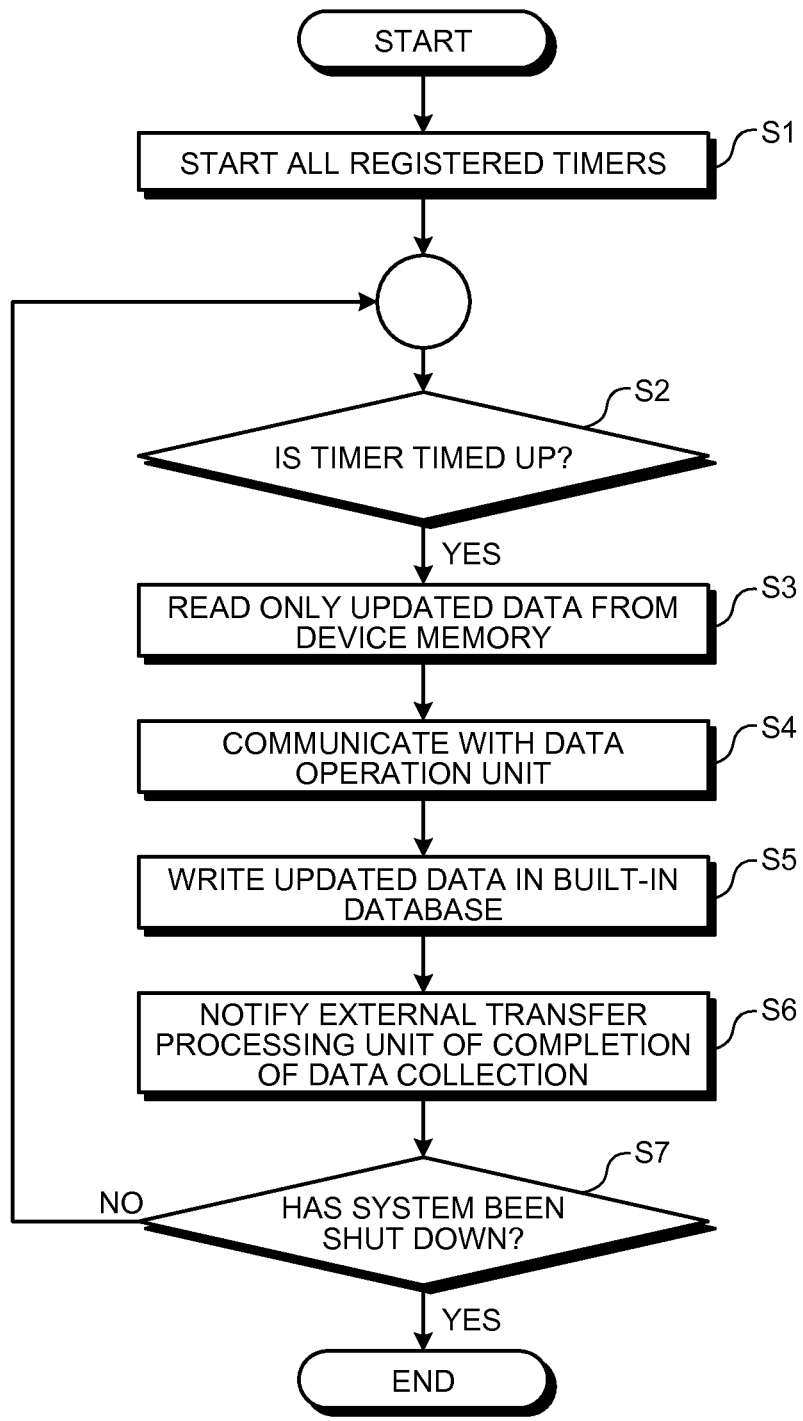
FIG. 5 is a flowchart illustrating an operation of a data collection unit of the control device according to the first embodiment of the present invention.

FIG. 5 is a flowchart illustrating an operation of the data collection unit 312. If a system is activated, then the data collection unit 312 activates a timer registered in the system (Step S1). The timer defines a cycle to perform a data collection process. The cycle to perform the data collection process may be individually defined for each signal in the signal definition data D1. Further, the cycle to perform the data collection process may be different for each signal. When a plurality of cycles are present, a plurality of timers that define the respective cycles are prepared.

If a certain timer is timed up (YES at Step S2), then the data collection unit 312 reads device data related to the timer from the device memory 250 (Step S3). At this time, it is preferred that the data collection unit 312 reads the device data only when the current value has been updated from the previous value.

Subsequently, the data collection unit 312 communicates with the data operation unit 313 (Step S4). If the data operation processing by the data operation unit 313 is completed, then the data collection unit 312 writes the device data read from the device memory 250 in the built-in database 330 (Step S5). In this case, the data written in the built-in database 330 includes not only the device data read from the device memory 250 at Step S3, but also the device data updated by the data operation processing at Step S4.

Subsequently, the data collection unit 312 notifies the external transfer processing unit 314 of the completion of the data collection process (Step S6). If the system has not been shut down (NO at Step S7), then the procedure returns to Step S2. If the system has been shut down (YES at Step S7), then the processing flow finishes.

Figure 6:
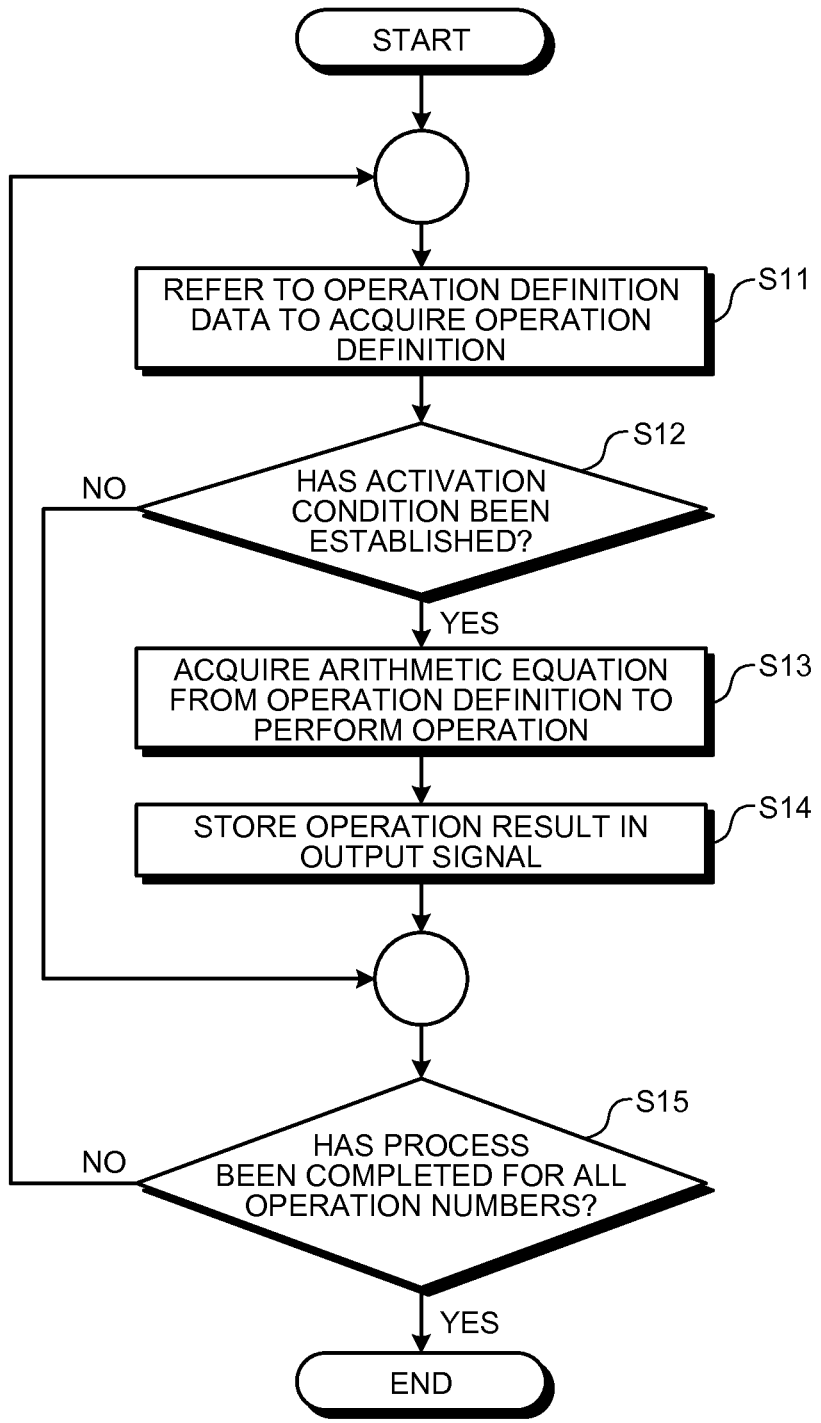
FIG. 6 is a flowchart illustrating an operation of a data operation unit of the control device according to the first embodiment of the present invention.

FIG. 6 is a flowchart illustrating an operation of the data operation unit 313 at Step S4 described above. The data operation unit 313 refers to the operation definition data D2 to acquire an attribute (an activation condition expression, an output signal, an arithmetic equation) of each of the arithmetic processings in order of operation numbers (Step S11). Thereafter, the data operation unit 313 performs the next process according to the acquired attribute.

Specifically, the data operation unit 313 determines whether an activation condition specified by the acquired "activation condition expression" has been satisfied (Step S12). If the activation condition has not been satisfied (NO at Step S12), then the procedure proceeds to Step S15. If the activation condition has been satisfied (YES at Step S12), then the data operation unit 313 performs an operation specified by the acquired "arithmetic equation" (Step S13). Further, the data operation unit 313 stores an operation result in a signal specified by the acquired "output signal" (Step S14). That is, the data operation unit 313 writes the operation result in the device memory 250. Thereafter, the procedure proceeds to Step S15.

At Step S15, the data operation unit 313 determines whether the process has been completed for all the operation numbers defined in the operation definition data D2. If the process has not been completed (NO at Step S15), then the procedure returns to Step S11, where the above process is performed for the next operation number. If the process has been completed for all the operation numbers (YES at Step S15), then the data operation processing is completed.

Figure 7:
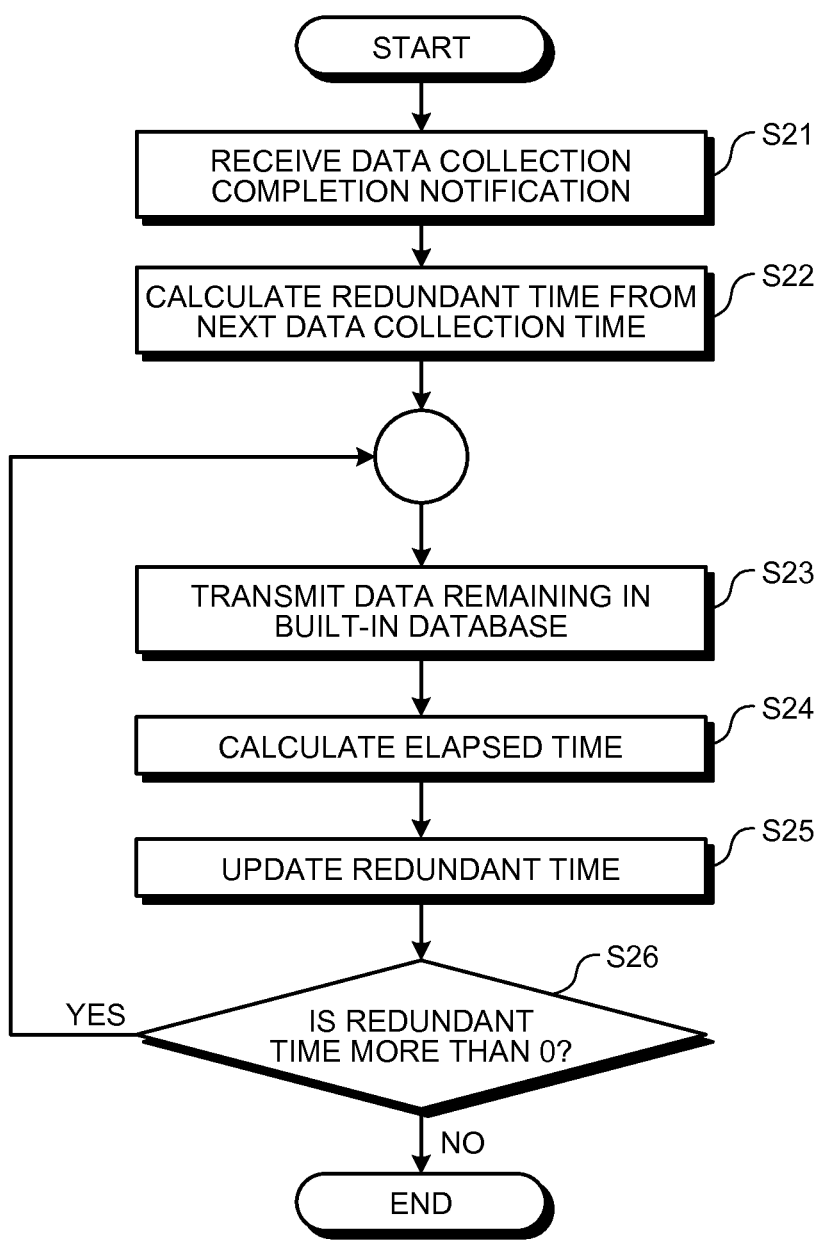
FIG. 7 is a flowchart illustrating an operation of an external transfer processing unit of the control device according to the first embodiment of the present invention.

FIG. 7 is a flowchart illustrating an operation of the external transfer processing unit 314. The external transfer processing unit 314 receives a data collection completion notification transmitted from the data collection unit 312 at Step S6 described above (Step S21).

In response to the data collection completion notification, the external transfer processing unit 314 calculates a redundant time to the start of the next data collection process (Step S22). The redundant time is a time obtained by subtracting the current time from the next data collection time. The next data collection time can be ascertained by referring to all the timers activated at Step S1 described above.

Subsequently, the external transfer processing unit 314 transmits at least a part of the device data remaining in the built-in database 330 (Step S23). The external transfer processing unit 314 then calculates an elapsed time at Step S23 (Step S24). The external transfer processing unit 314 updates the redundant time by subtracting the elapsed time from the redundant time (Step S25).

If there is still the redundant time (YES at Step S26), then the procedure returns to Step S23. If there is no redundant time (NO at Step S26), then the external transfer process finishes.

In this manner, in the example illustrated in FIG. 5 to FIG. 7, the data collection unit 312 regularly performs the data collection process. When the data collection unit 312 is not performing the data collection process, that is, during the idle time, the external transfer processing unit 314 performs the external transfer process.

<Monitoring Terminal>

Figure 8:
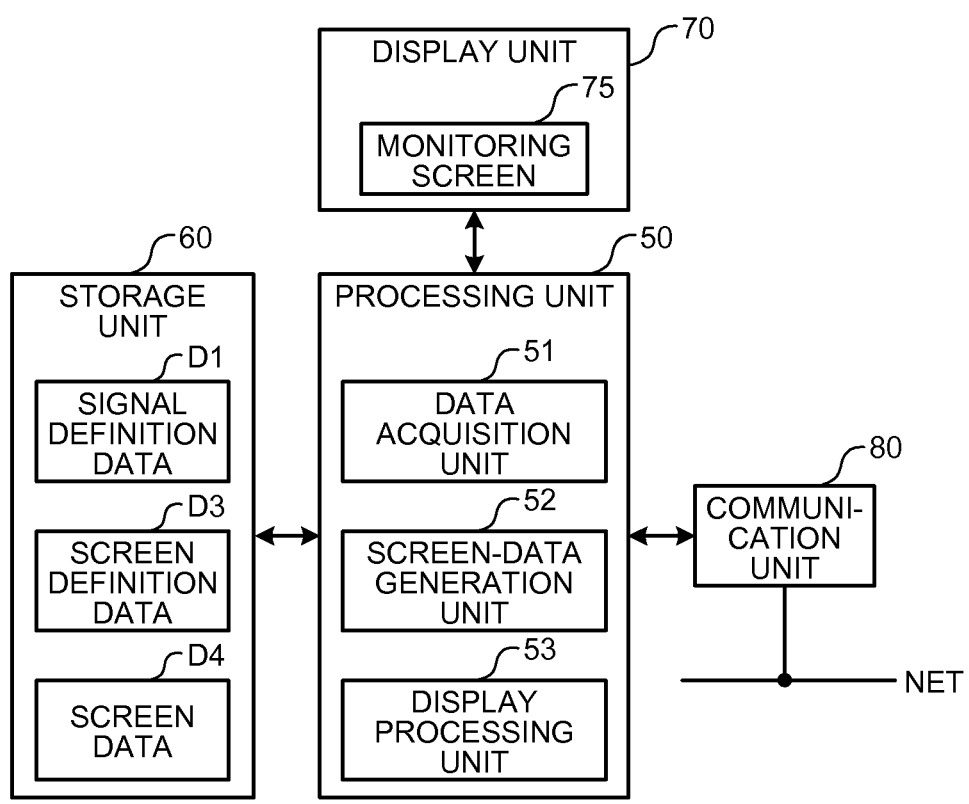
FIG. 8 is a block diagram illustrating a configuration example of a monitoring terminal according to the first embodiment of the present invention.

The monitoring terminal 40 in the high-order system 10 is described next. FIG. 8 is a block diagram illustrating a configuration example of the monitoring terminal 40 according to the present embodiment. The monitoring terminal 40 includes a processing unit 50, a storage unit 60, a display unit 70, and a communication unit 80.

The processing unit 50 is a data processing device that performs various types of data processing. As illustrated in FIG. 8, the processing unit 50 includes, as functional blocks, a data acquisition unit 51, a screen-data generation unit 52, and a display processing unit 53. These functional blocks are realized by the processing unit 50 for executing an HMI (Human Machine Interface) program. Note that the HMI program may be recorded on a computer readable recording medium. Details of the process performed by the processing unit 50 are described later.

The storage unit 60 is a memory such as an RAM or an HDD. In the storage unit 60, the signal definition data D1, screen definition data D3, and screen data D4 are stored. The signal definition data D1 is data as described above, and is distributed from the setting terminal 20. The screen data D4 is data displayed on a monitoring screen 75 of the display unit 70, and indicates the contents of the device data. The screen definition data D3 is source data of the screen data D4. For example, the screen definition data D3 defines a screen layout, UI (User Interface) components to be used, the signal number of the device data to be displayed, and the like.

The display unit 70 has the monitoring screen 75 such as a touch panel. The screen data D4 is displayed on the monitoring screen 75. Based on the screen data D4 displayed on the monitoring screen 75A, the user can perform monitoring of the device control process in a plant and required data manipulation.

The communication unit 80 is a network interface for the information network NET. The processing unit 50 can access the information network NET via the communication unit 80.

Figure 9:
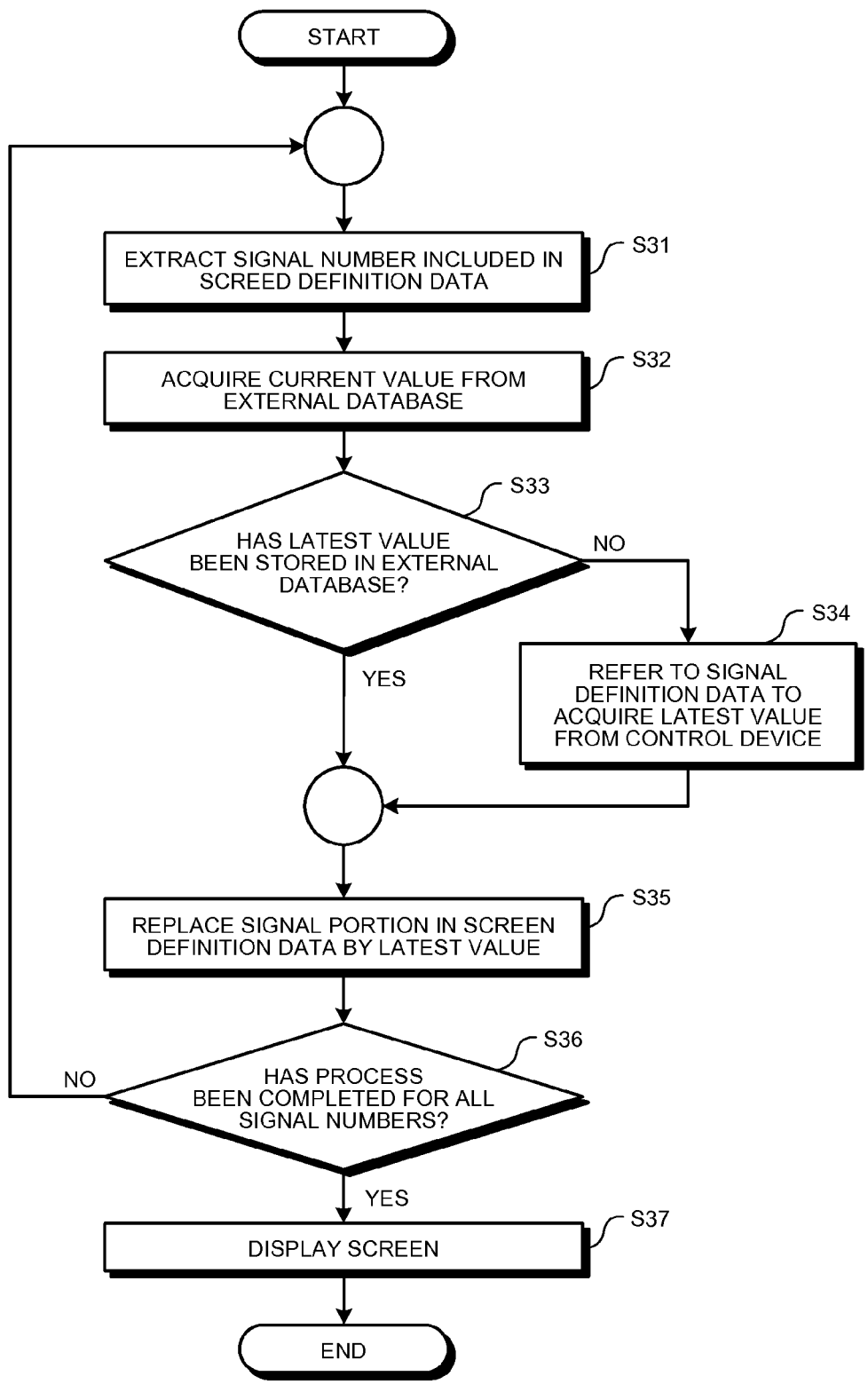
FIG. 9 is a flowchart illustrating an operation of the monitoring terminal according to the first embodiment of the present invention.

FIG. 9 is a flowchart illustrating an operation of the processing unit 50 of the monitoring terminal 40. The screen-data generation unit 52 reads the screen definition data D3 from the storage unit 60. Subsequently, the screen-data generation unit 52 sequentially extracts the signal number of the device data defined in the screen definition data D3 (Step S31). The screen-data generation unit 52 then requests the data acquisition unit 51 to acquire the latest value of the device data having the extracted signal number.

The data acquisition unit 51 acquires the requested latest value of the device data from the external database 35 or the built-in database 330 of the control device 100 by a search process. More specifically, the data acquisition unit 51 first searches the external database 35 to acquire the current value of the device data (Step S32). The data acquisition unit 51 then determines whether the current value acquired at Step S32 is the latest value (Step S33). This determination can be performed by referring to a time at which the current value has been written in the external database 35 and a cycle of the data collection process defined in the signal definition data D1.

If the latest value of the device data has been saved in the external database 35 (YES at Step S33), then the data acquisition unit 51 transfers the latest value to the screen-data generation unit 52. On the other hand, if the latest value of the device data has not been saved in the external database 35 (NO at Step S33), then the data acquisition unit 51 searches the built-in database 330 of the control device 100, and acquires the latest value of the device data (Step S34). At Step S34, the data acquisition unit 51 can ascertain a storage destination of the device data by referring to the signal definition data D1.

The screen-data generation unit 52 acquires the latest value of the device data from the data acquisition unit 51. The screen-data generation unit 52 then replaces the portion of the device data in the screen definition data D3 with the acquired latest value (Step S35). That is, the screen-data generation unit 52 embeds the acquired latest value of the device data in the screen definition data D3.

At Step S36, the screen-data generation unit 52 determines whether the process has been completed for all the signal numbers defined in the screen definition data D3. When the process has not been completed (NO at Step S36), the procedure returns to Step S31, where the above process is performed for the next signal number. When the process has been completed for all the signal numbers (YES at Step S36), the screen data D4 is completed.

In this manner, based on the device data acquired from the external database 35 or acquired from the built-in database 330 by the search, the screen-data generation unit 52 generates the screen data D4. The display processing unit 53 displays the screen data D4 on the monitoring screen 75 of the display unit 70 (Step S37).

Note that the functions of the data acquisition unit 51 and the screen-data generation unit 52 described above may be realized by the processing unit 50 for executing a script described in the screen definition data D3.

<Setting Terminal>

The setting terminal 20 is used for setting of setting information including the signal definition data D1 and the operation definition data D2. A setting tool is operated on the setting terminal 20. A user can input and edit of the setting information including the signal definition data D1 and the operation definition data D2 by activating the setting tool.

Figure 10:
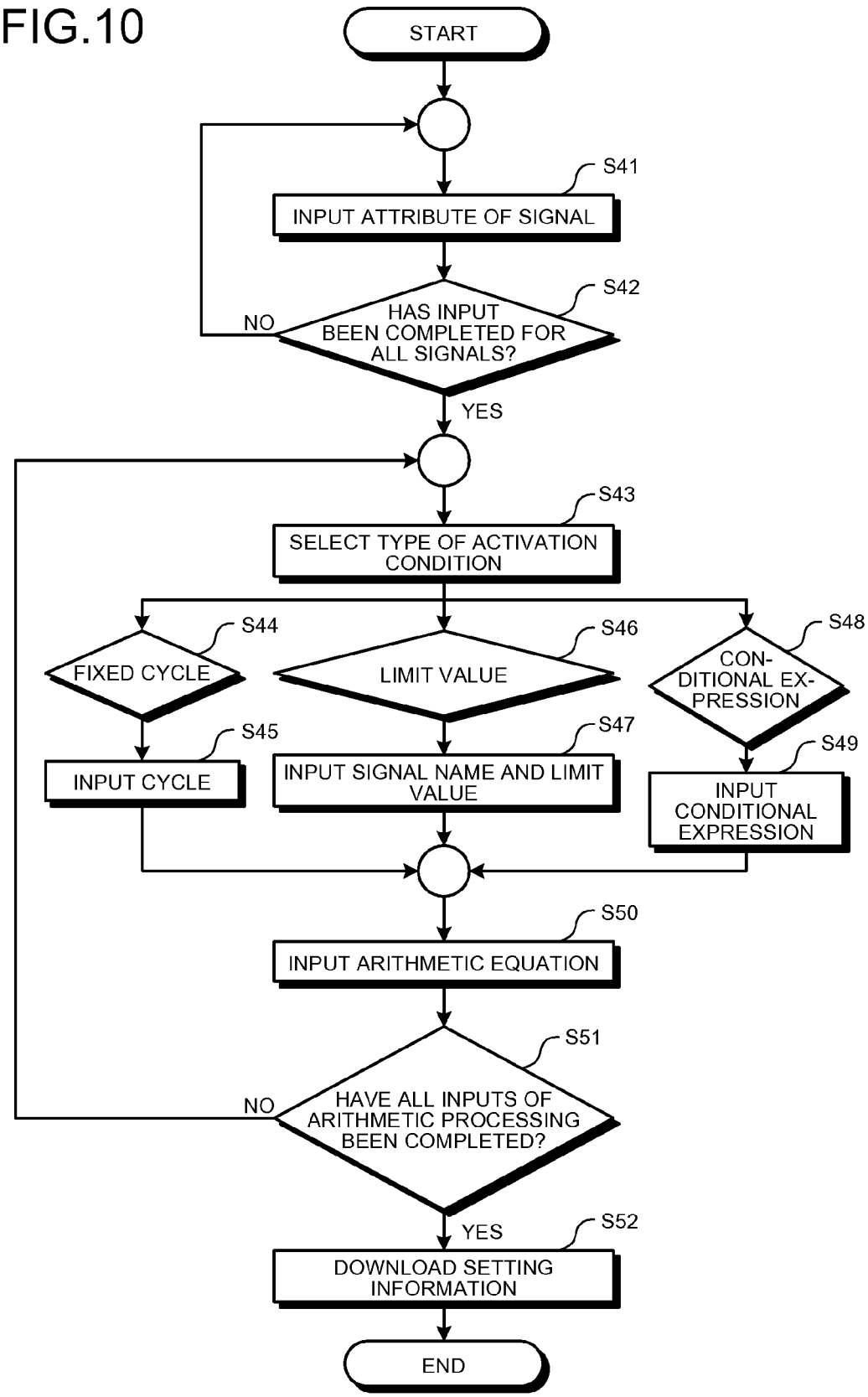
FIG. 10 is a flowchart illustrating a procedure of setting information by using a setting terminal according to the first embodiment of the present invention.

FIG. 10 is a flowchart illustrating a procedure of setting setting information by using the setting terminal 20. At Steps S41 and S42, a user inputs an attribute of a desired signal to generate the signal definition data D1 (see FIG. 3).

At Steps S43 to S51, the user inputs an attribute of desired arithmetic processing to generate the operation definition data D2 (see FIG. 4). Specifically, the user first selects the type of activation condition (Step S43). As the type of activation condition, "fixed cycle", "limit value", and "conditional expression" can be considered. Note that other types of activation condition can be used as far as the condition can be stylized. In the case of "fixed cycle" (Step S44), the user inputs a cycle to activate the arithmetic processing (Step S45). In the case of "limit value" (Step S46), the user inputs signal name and a limit value of the signal (Step S47). In the case of "conditional expression" (Step S48), the user inputs the conditional expression (Step S49). Subsequently, the user inputs an arithmetic equation to be executed when the activation condition is established (Step S50).

If all the inputs of the desired arithmetic processing are completed (YES at Step S51), then the setting information including the signal definition data D1 and the operation definition data D2 are downloaded from the setting terminal 20 to the control device 100 (Step S52). That is, the setting information generated by using the setting terminal 20 is developed in the control device 100.

<Effect>

According to the present embodiment, the control device 100 includes the information CPU 300 in addition to the control CPU 200 that performs the device control process. The information CPU 300 includes the built-in database 330 and the data collection unit 312 that performs the data collection process. In the data collection process, the data collection unit 312 reads the device data from the device memory 250 for the device control process, and stores the read device data in the built-in database 330. The device data stored in the built-in database 330 can be referred to from the monitoring terminal 40 by the search process as necessary.

In this manner, according to the present embodiment, the data collection function, which is a part of the conventional SCADA functions, is incorporated in the control device 100. Therefore, the load on the monitoring terminal 40 of the high-order system 10 can be reduced. This means that the requirement of performance for the monitoring terminal 40 is relaxed. Accordingly, for example, an inexpensive general-purpose PC can be used instead of an expensive industrial PC (an FA personal computer) as the monitoring terminal 40. Consequently, costs related to system construction can be reduced.

Furthermore, the information CPU 300 and the device memory 250 are connected with each other via the high-speed bus 400. Therefore, the data collection process can be realized at a higher speed than the case using the network. That is, high-performance data collection process is possible.

Further, the information CPU 300 is provided separately from the control CPU 200. Therefore, the data collection process performed by the information CPU 300 does not affect the device control process performed by the control CPU 200.

Furthermore, the information CPU 300 according to the present embodiment includes the external transfer processing unit 314 that performs the external transfer process in the idle time or the like. In the external transfer process, at least a part of the device data stored in the built-in database 330 is transferred to the external database 35 of the high-order system 10. That is, according to the present embodiment, the built-in database 330 is used as the "cache", and the contents of the built-in database 330 are reflected in the external database 35 as required.

Accordingly, large-capacity data can be saved for a long time period without increasing the capacity of the built-in database 330 of the control device 100. That is, the large-capacity data can be handled for a long time period without increasing the cost and the size of the control device 100.

Further, the information CPU 300 according to the present embodiment also includes the data operation unit 313 that performs the data operation processing. The contents of the data operation processing can be set as appropriate by editing the operation definition data D2. For example, the unit of the device data indicated by the above Equation (1) can be converted to a unit that can be easily handled by the monitoring terminal 40. By performing such unit conversion in the control device 100, the load on the monitoring terminal 40 can be further reduced. This also contributes to the reduction of costs related to the system construction.

As described above, according to the present embodiment, the monitoring control system 1 can be realized at a low cost.

Second Embodiment

Figure 11:
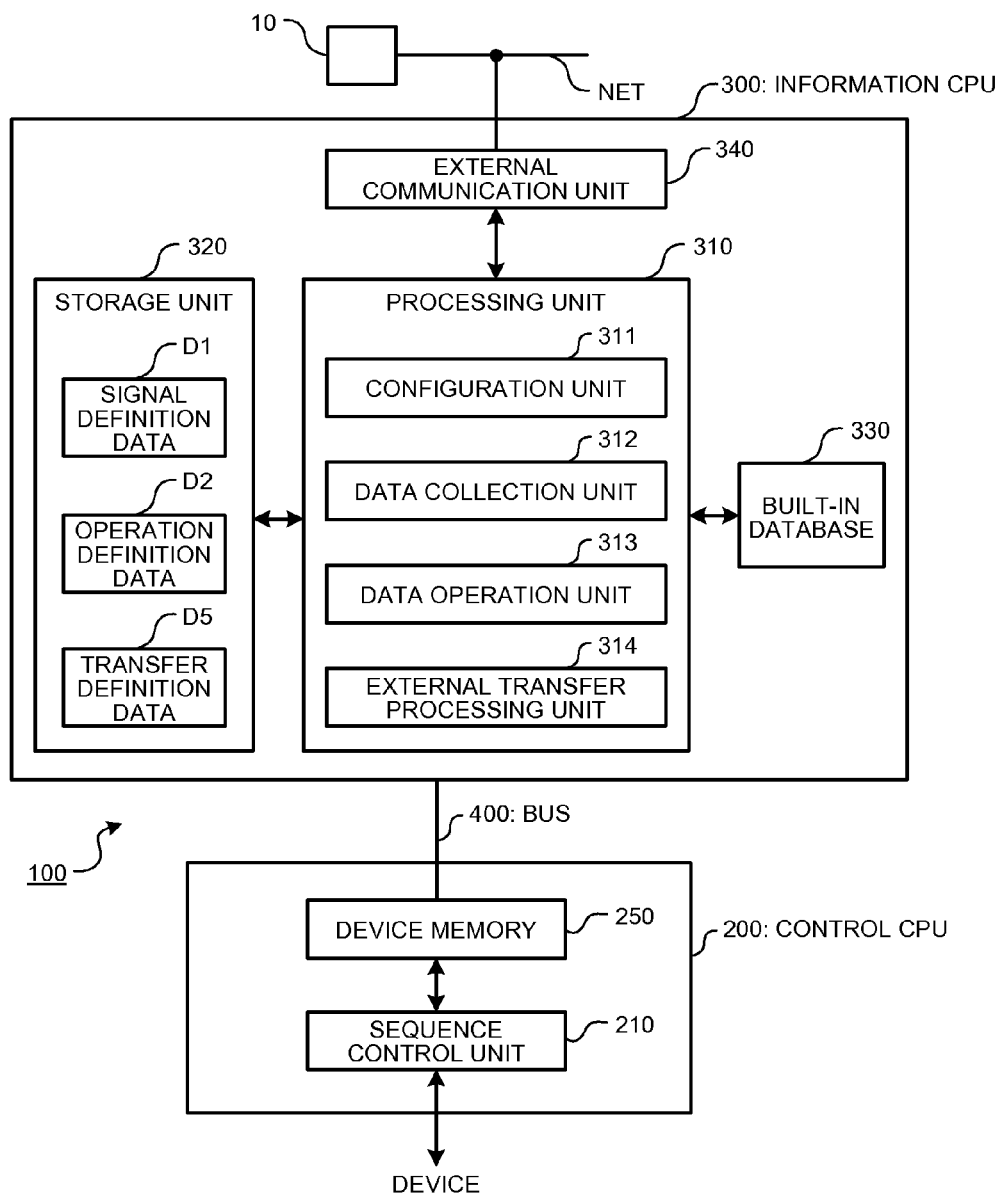
FIG. 11 is a block diagram illustrating a configuration example of a control device according to a second embodiment of the present invention.

FIG. 11 is a block diagram illustrating a configuration example of the control device 100 according to a second embodiment of the present invention. As compared to the configuration of the first embodiment illustrated in FIG. 2, transfer definition data D5 is further stored in the storage unit 320 of the information CPU 300. This transfer definition data D5 is date that defines external transfer conditions. The transfer definition data D5 can be also set as appropriate by the setting terminal 20 of the high-order system 10, like other pieces of definition data. The external transfer processing unit 314 refers to the transfer definition data D5 stored in the storage unit 320 to perform the external transfer process according to the external transfer condition specified in the transfer definition data D5.

As an example of the external transfer condition, it is conceivable that "the data collection unit 312 is not performing the data collection process", that is, it is "idle time".

As another example of the external transfer condition, it is conceivable that "the usage rate of the built-in database 330 has exceeded a predetermined threshold (usage rate threshold)". As still another example of the external transfer condition, it is conceivable that "the load (communication traffic or the like) of the control device 100 is lower than a predetermined threshold (load threshold)". The external transfer condition may be any one of these conditions or can be arbitrary combinations of these conditions.

According to the present embodiment, by using the setting terminal 20, the external transfer condition can be arbitrarily customized. While the system environment varies for each case, according to the present embodiment, the external transfer process can be performed at an optimum timing in accordance with the system environment.

Note that the functional extension of the external transfer processing unit 314 as described above may be realized by Add-in for the data processing program executed by the information CPU 300.

Third Embodiment

Figure 12:
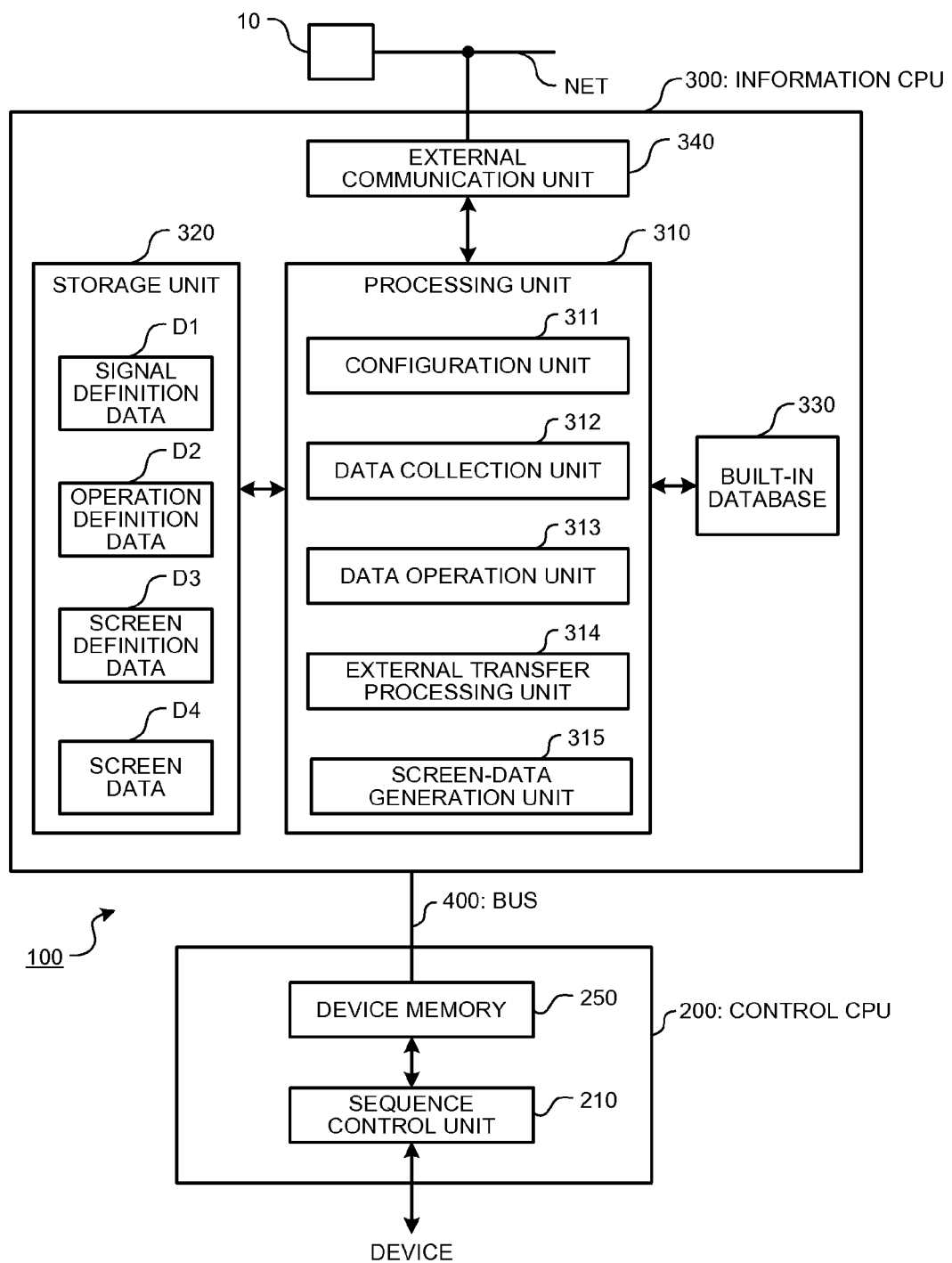
FIG. 12 is a block diagram illustrating a configuration example of a control device according to a third embodiment of the present invention.

FIG. 12 is a block diagram illustrating a configuration example of the control device 100 according to a third embodiment of the present invention. As compared to the configuration of the first embodiment illustrated in FIG. 2, the processing unit 310 of the information CPU 300 further includes a screen-data generation unit 315. Further, the screen definition data D3 and the screen data D4 are stored in the storage unit 320.

The function of the screen-data generation unit 315 is similar to that of the screen-data generation unit 52 of the monitoring terminal 40 in the first embodiment. However, the screen-data generation unit 315 reads the latest value of the required device data from the built-in database 330 or the device memory 250 at a high speed. The screen-data generation unit 315 then embeds the acquired latest value of the device data in the screen definition data D3, so as to generate the screen data D4.

Note that the function of the screen-data generation unit 315 may be realized by the processing unit 310 for executing a script described in the screen definition data D3.

The screen data D4 generated by the information CPU 300 of the control device 100 is downloaded to the monitoring terminal 40 via the information network NET. The monitoring terminal 40 displays the screen data D4 acquired in this manner on the monitoring screen 75. At this time, because the screen data D4 has been already completed, the monitoring terminal 40 does not need to access the external database 35 or the built-in database 330 of the control device 100.

In this manner, according to the present embodiment, the screen-data generation function is transferred from the monitoring terminal 40 to the information CPU 300 of the control device 100. Further, the monitoring terminal 40 does not need to access the external database 35 or the built-in database 330 of the control device 100 in order to generate the screen data D4 by itself. Therefore, the load on the monitoring terminal 40 can be further reduced. This also contributes to the reduction of costs related to the system construction.

Embodiments of the present invention have been described above with reference to the accompanying drawings. However, the present invention is not limited to the embodiments described above, and can be modified as appropriate by persons skilled in the art without departing from the scope of the invention.

REFERENCE SIGNS LIST 1 monitoring control system, 10 high-order system, 20 setting terminal, 30 database terminal, 35 external database, 40 monitoring terminal, 50 processing unit, 51 data acquisition unit, 52 screen-data generation unit, 53 display processing unit, 60 storage unit, 70 display unit, 75 monitoring screen, 80 communication unit, 100 control device, 200 control CPU, 210 sequence control unit, 250 device memory, 300 information CPU, 310 processing unit, 311 configuration unit, 312 data collection unit, 313 data operation unit, 314 external transfer processing unit, 315 screen-data generation unit, 320 storage unit, 330 built-in database, 340 external communication unit, 400 bus, D1 signal definition data, D2 operation definition data, D3 screen definition data, D4 screen data, D5 transfer definition data, NET information network.

The invention claimed is:

1. A monitoring control system comprising:
a control device that performs a device control process of controlling an operation of a device; and
a high-order system that is connected to the control device and includes a monitoring terminal for monitoring the device control process, wherein
the control device includes
a control CPU that performs the device control process, and
an information CPU that is connected to the control CPU via an internal bus,
the control CPU includes a device memory that stores therein device data to be used for the device control process, the device data being related to the device, and
the information CPU includes
a built-in database,
a function of a data collection unit that performs a data collection process of reading the device data from the device memory via the internal bus, and storing the read device data in the built-in database, and
an external transfer processing unit that transfers the device data stored in the built-in database to an external database provided in the high-order system if an external transfer condition is satisfied,
the monitoring terminal acquires the device data from the external database or the built-in database by a search process, and
the information CPU further comprises:
a storage unit that stores therein operation definition data specifying an operation activation condition and contents of arithmetic processing, and
a data operating unit that performs the arithmetic processing on the device data read in the data collection process if the operation activation condition is satisfied, and that writes a result of the arithmetic processing in the device memory.

2. The monitoring control system according to claim 1, wherein:
the data collection unit regularly performs the data collection process, and
the external transfer condition includes a condition that the data collection unit is not performing the data collection process.

3. The monitoring control system according to claim 1, wherein the external transfer condition includes at least one of following conditions that:
the data collection unit is not performing the data collection process;
a load of the control device is lower than a load threshold; and
a usage rate of the built-in database is higher than a usage rate threshold.

4. The monitoring control system according to claim 1, wherein
the monitoring terminal generates screen data indicating contents of the device data based on the device data acquired from the external database or the built-in database and displays the generated screen data on the monitoring screen of the monitoring terminal.

5. The monitoring control system according to claim 1, wherein
the information CPU further includes a screen-data generation unit,
the screen-data generation unit reads the device data from the device memory or the built-in database so as to generate the screen data indicating contents of the device data based on the read device data, and
the monitoring terminal acquires the screen data generated by the screen-data generation unit, and displays the acquired screen data on a monitoring screen of the monitoring terminal.

6. The monitoring control system according to claim 1, wherein the high-order system includes a setting terminal used for setting of the operation definition data.

7. A control device that performs a device control process of controlling an operation of a device and is connected to a high-order system that includes a monitoring terminal for monitoring the device control process, the control device comprising:
a control CPU that performs the device control process; and
an information CPU that is connected to the control CPU via an internal bus, wherein
the control CPU includes a device memory that stores therein device data to be used for the device control process, the device data being related to the device, and
the information CPU includes
a built-in database, and
a data collection unit that performs a data collection process of reading the device data from the device memory via the internal bus, and storing the read device data in the built-in database, and
an external transfer processing unit that transfers the device data stored in the built-in database to an external database provided in the high-order system if an external transfer condition is satisfied,
the monitoring terminal acquires the device data from the external database or the built-in database by a search process, and
the information CPU further comprises
a storage unit that stores therein operation definition data specifying an operation activation condition and contents of arithmetic processing, and
a data operation unit that performs the arithmetic processing on the device data read in the data collection process if the operation activation condition is satisfied, and that writes a result of the arithmetic processing in the device memory.

* * * * *